United States Patent
Kojima et al.

[11] Patent Number: 5,903,392
[45] Date of Patent: May 11, 1999

[54] REFLECTING SCREEN

[75] Inventors: Hiroshi Kojima; Fumihiro Arakawa, both of Shinjuku-Ku, Japan

[73] Assignee: Dai Nippon Printing Co., Ltd., Japan

[21] Appl. No.: 09/074,311

[22] Filed: May 8, 1998

[30] Foreign Application Priority Data

May 19, 1997 [JP] Japan ..................................... 9-142927

[51] Int. Cl.$^6$ .............................. G02B 5/02; G02B 13/20
[52] U.S. Cl. ........................... 359/599; 359/707; 359/834
[58] Field of Search .................................... 359/453–457, 359/460–461, 595–599, 707, 613, 831, 614, 833–834; 349/54–65; 362/31, 32

[56] References Cited

U.S. PATENT DOCUMENTS

| | | | |
|---|---|---|---|
| 4,906,070 | 3/1990 | Cobb, Jr. .................................. | 359/834 |
| 5,187,611 | 2/1993 | White et al. .............................. | 359/599 |
| 5,212,596 | 5/1993 | Andrus .................................... | 359/614 |
| 5,467,417 | 11/1995 | Nakamura et al. ...................... | 359/834 |
| 5,550,676 | 8/1996 | Ohe et al. ................................ | 359/599 |

FOREIGN PATENT DOCUMENTS 6-18707  1/1994  Japan ..................................... 359/599

*Primary Examiner*—Thong Nguyen
*Attorney, Agent, or Firm*—Parkhurst & Wendel, L.L.P.

[57] ABSTRACT

This invention provides a reflecting screen with a wide angle of field and high luminance usable in a video projector or the like, and comprising a first sheet having a first surface having a diffusion layer for diffusing a projected image, and a second surface formed on a side opposite to the first surface and having a group of striped prisms of an optically transparent resin arranged so as to extend vertically, the prisms having a section in the shape of an isosceles triangle with a constant apical angle and sides of constant length; and a second sheet opposed to the group of prisms of the second surface of the first sheet, a surface of the second sheet opposed to the group of prisms being of a black color capable of absorbing transmitted light substantially; the first sheet and the second sheet being disposed parallel to each other.

7 Claims, 2 Drawing Sheets

REFLECTING SCREEN

BACKGROUND OF THE INVENTION

This invention relates to a reflecting screen for use in a video projector or the like. More specifically, the invention relates to a reflecting screen with excellent contrast characteristics in a horizontal angle of visual field (hereinafter referred to as angle of field) and a bright field.

Properties required of a reflecting screen are high luminance, i.e., high reflectivity of light, satisfactory diffusion performance that light can be diffused uniformly in a desired direction, and high contrast. Thus, proposals have been made for a projection screen having a coating of a calcite powder-containing paint on a substrate sheet as disclosed in Japanese Unexamined Patent Publication No. 4-53945, and reflecting screens having a prism function as in Japanese Unexamined Utility Model Publication No. 54-26378 and U.S. Pat. No. 4,906,070. Japanese Unexamined Patent Publication No. 62-266980 proposes an image projection system having a polarizing filter integrally attached to a surface on the side of an image projector.

These technologies, however, have not enabled conventional reflecting screens to give satisfactory properties in any of the desired reflection luminance (gain), angle of field, and contrast.

DISCLOSURE OF THE INVENTION

The present invention has been accomplished in light of the foregoing earlier technologies, and makes it an object to provide a reflecting screen having a sufficient reflection luminance, a wide angle of field, and a high contrast even during magnified projection. This invention is characterized in that a group of prisms for returning incident rays in a certain direction are provided in a rear part of the reflecting screen.

That is, the reflecting screen of the present invention comprises a first sheet having a first surface having a diffusion layer for diffusing a projected image, and a second surface formed on a side opposite to the first surface and having a group of striped prisms of an optically transparent resin arranged so as to extend vertically, the prisms having a section in the shape of an isosceles triangle with a constant apical angle and sides of constant length; and a second sheet opposed to the group of prisms of the second surface of the first sheet, a surface of the second sheet opposed to the group of prisms being of a black color capable of absorbing transmitted light substantially; the first sheet and the second sheet being disposed parallel to each other. Constituted in this manner, the reflecting screen can give a wide angle of field, and a projected image of high reflection luminance and high contrast.

BEST MODE FOR CARRYING OUT THE INVENTION

Figure 1:
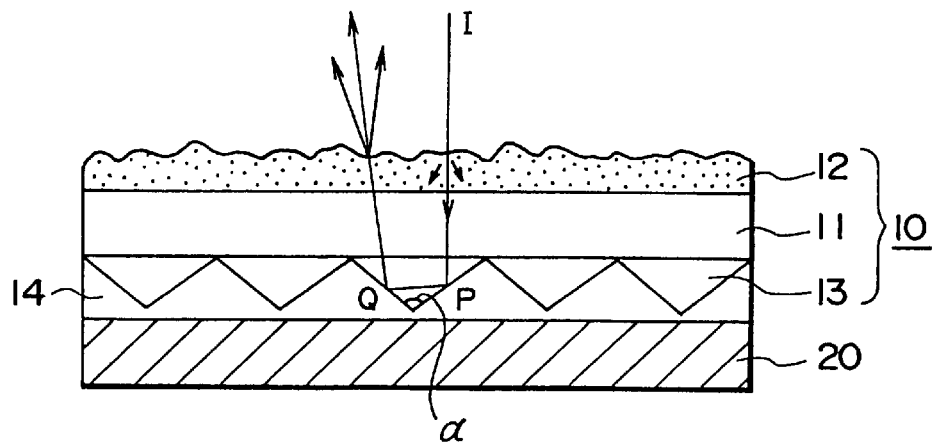
FIG. 1 is a view illustrating a reflecting screen of the present invention.

FIG. 1 is a sectional view illustrating a reflecting screen of the present invention. This drawing shows a section of the screen parallel to the line of sight when the screen is viewed with both eyes. As shown in FIG. 1, the reflecting screen of the present invention is composed of a first sheet 10 and a second sheet 20. The first sheet consists of a substantially transparent substrate 11, a photodiffusion layer 12 formed on a first surface of the substrate 11, and a group of prisms 13 formed on a second surface of the substrate 11. Each prism is formed in a uniform shape, and arranged such that its bottom side lies on the substrate. The substrate 11 may be essentially nonexistent, and the group of prisms 13 may be formed directly behind the photodiffusion layer 12. The photodiffusion layer 12 is designed to diffusively reflect an image projected onto the surface of the screen, and has a composition comprising a photodiffusion agent dispersed in a transparent resin material. Projected light from a video projector or the like is diffused and reflected by the diffusion layer, and can thereby broaden the field of view. The prisms constituting the group of prisms are of a substantially uniform shape and in a striped pattern, and are formed of an optically transparent resin. These prisms are arranged so as to extend vertically at right angles to the line of sight of both eyes viewing the screen. The group of prisms reflect transmitted light, without wasting it, thus enhancing the reflection luminance of the screen. The second sheet surface opposed to the group of prisms is made black, absorbing surplus scattered light that has passed through the group of prisms, thus producing the effect of enhancing contrast of the image.

In the screen of FIG. 1, the apical angle α of each prism is greater than 90°. Thus, an incident ray I after reflection by oblique sides P, Q of the prism (part of light is transmitted toward the second sheet) does not become parallel to the original path of incident light, but spreads in a diffused state. In principle, when the apical angle α is 90°, the incident ray I is reflected parallel, achieving a high gain. When α is larger or smaller than 90°, a low gain is obtained in either case.

Figure 2:
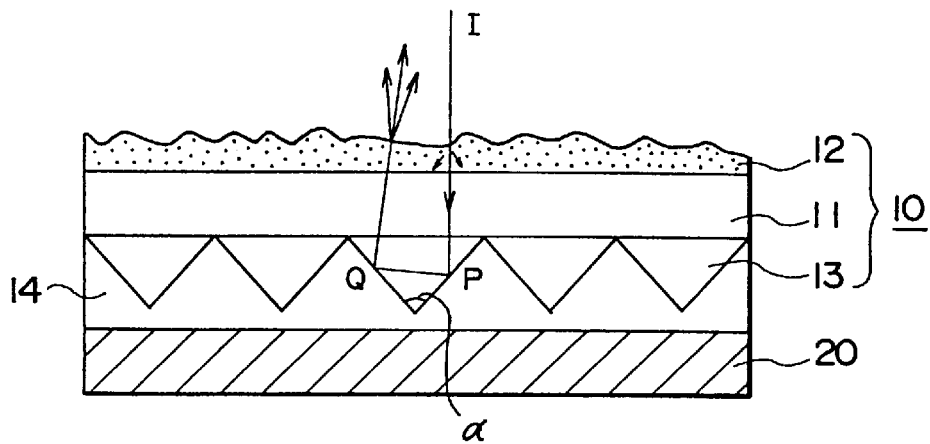
FIG. 2 is a view illustrating the reflecting screen of the present invention in which an apical angle α is less than 90°.

FIG. 2 is a view illustrating the reflecting screen of the present invention with an apical angle α of less than 90°. As shown in FIG. 2, light projected by a video projector or the like first enters the photodiffusion layer 12 of the first sheet. Part of the light is reflected in a diffused manner by the diffusion agent, while another part of the light passes through the diffusion layer and the substrate 11, falling into the prism 13 disposed behind. When the apical angle α of the prism is less than 90° in this manner, this part of light is not reflected at right angles on the points P, Q, but is diffused in the direction opposite to the direction shown in FIG. 1.

When the apical angle α is thus apart from 90°, the angle of incidence and the angle of reflection are not parallel to each other, so that a gain in the front direction is not obtained. Actually, it has been found that when the apical angle α is from about 90° to 100° or less, a viewing image plane presenting practically no problem is obtained.

Figure 3:
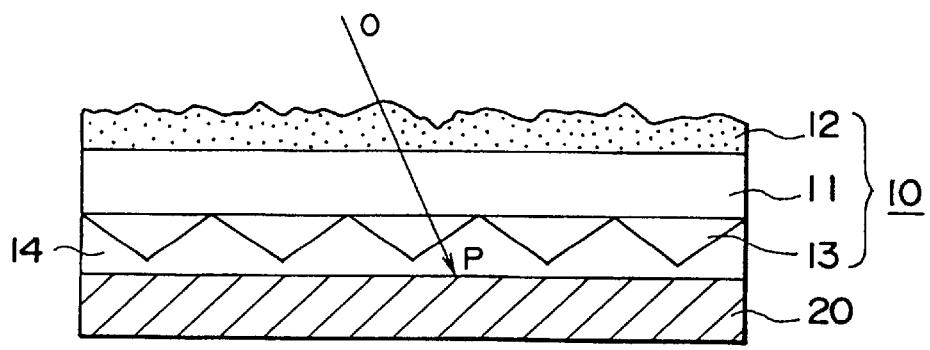
FIG. 3 is a view showing an optical path of external light entering the reflecting screen.

FIG. 3 is a view showing an optical path of external light entering the reflecting screen. External light, which is often incident on the screen surface at an acute angle, is caused to pass through the prism, and is absorbed by the second sheet 20.

A gap portion 14 between the first sheet and the second sheet may be a space, as long as both sheets can be laid close to each other and kept parallel. Actually, however, both sheets are bonded together with a suitable adhesive. In this case, the smaller the area of contact between the plastic material constituting the prisms and the adhesive, the higher the efficiency of reflection becomes. Part of light that is not reflected at the point P or Q but passes through the prism turns into unnecessary scattered light. This light is absorbed by the black surface of the second sheet.

As mentioned earlier, when the apical angle α is 90°, reflected rays return along paths parallel to the paths of incident rays. This is essentially preferred for viewing a projected image, but poses the problem that only the luminance in the direction of projection is high, and a wide angle of field is not obtained. The most preferable ranges for the angle of field and luminance of an image plane created by the reflecting screen cannot be determined definitely because of uses for the reflecting screen and viewers' subjective preference. With a reflecting screen using prisms as in the present invention, however, a prism apical angle of less than 90° or more than 100° results in poor efficiency of reflected light. Thus, an image plane with a high gain and a wide angle of field is not obtained.

Our various attempts showed that an apical angle of 90° led to a half-value angle of 34 to 37°, which satisfied a practical angle of field and gave a bright image plane.

The diffusion layer on the first surface and the prisms on the second surface in the reflecting screen of the present invention are preferably colored so as to have an absorption peak in the wavelength range from 530 nm to 570 nm. This is intended to cut green light with a high visual sensitivity from reflected light, thereby bringing a dark area of the image plane close to neutral black. Such coloration is performed by adding a suitable coloring agent, such as phthalocyanine blue, Sumiplast Blue or Sumiplast Violet (products of SUMITOMO CHEMICAL CO., LTD.), or carbon black, singly or in combination, to a composition constituting the diffusion layer.

The surface of the second sheet opposed to the group of prisms in the reflecting screen of the present invention preferably has reflectivity for all rays of 10% or less. Because of this, light incident on the prism surface at an acute angle and passing through the prism is maximally absorbed and not reflected as scattered light.

A method of producing the above-described reflecting screen will now be described.

A substrate which will serve as the first sheet is procured. This substrate may be a suitably selected material which has transparency, heat resistance, solvent resistance and dimensional stability, and is strong because the resulting screen is used repeatedly. Examples of the substrate are about 50 to 500 μm, preferably 75 to 200 μm thick sheets or plates of resins such as polyethylene terephthalate, triacetyl cellulose, polyethylene naphthalate, polyvinyl chloride, polypropylene, acrylics, polyimide, diacetate, triacetate, and polystyrene.

Then, the photodiffusion layer 12 is formed on the first sheet. For this photodiffusion layer 12, a composition comprising a photodiffusion agent dispersed in a transparent binder resin can be used. The binder resin may be polyester resin, polyvinyl chloride resin, acrylic resin, epoxy resin or polyolefin resin used alone or as a mixture. The photodiffusion agent may be an organic or inorganic diffusion agent whose appropriate particle size is from about 1 μm to 50 μm.

The photodiffusion composition can be coated suitably on the first sheet by a coating method such as roll coating, knife coating, gravure coating, reverse coating, or bar coating. The appropriate coating thickness is about 10 to 50 μm in dry condition.

To form the prisms on the second surface of the first sheet, an ultraviolet ray curing or electron beam curing resin which is transparent and of an epoxy, polyester, acrylate or urethane acrylate type can be used preferably. A lens-shaped material as the prism can be formed, for example, by feeding a continuously extruded resin composition between the first sheet and a mold roll having the shape of prisms continuously formed on the circumference thereof, and irradiating the fed composition with ultraviolet rays, while the first sheet is moving along the mold roll, to cure the composition. Alternatively, the prisms on the first sheet can be formed by separately preparing the first sheet having the photodiffusion surface formed thereon, and a sheet having the group of prisms formed thereon, and laminating the first sheet and the sheet together. The prisms are formed usually with a pitch of about 0.02 mm to 2.0 mm, although the pitch varies with the size of pixels making up an image.

On the thus formed first sheet with the photodiffusion layer and the prisms, the second sheet that has been formed from a dark, low reflectivity resin composition or that has been coated with a low reflectivity coating is laminated to complete the reflecting screen of the present invention. Such a low reflectivity resin composition may be a composition formed by adding carbon black or other dark coloring agent to vinyl chloride resin, polyethylene resin, acrylic resin or polypropylene resin, and roughening the surface of the mixture.

EXAMPLES

Examples 1 to 3 of the present invention and Comparative Examples 1 to 3 will be described. Materials common to the Examples and Comparative Examples are as follows:

(A) First sheet substrate
 A 100 μm PET film ("MX-518", ICI Japan)
(B) Photodiffusion agent composition
 Binder: Polyester resin  43 parts by weight
 ("Vylon 200", TOYOBO CO., LTD.)
 Photodiffusion agent: MBX-10  100 parts by weight
 (a product of Sekisui Plastics Co., Ltd.; material:
 polymethyl methacrylate, average particle size 10 μm)
 Diluents: Methyl ethyl ketone  60 parts by weight
 Toluene  60 parts by weight
  (solids content 54%)
(C) Prism forming material
 Resin material: Ultraviolet curing resin, epoxyacrylate ("C5-979", DAINIPPON INK & CHEMICALS, INC.)
 Reflectivity at curing: 1.57
(D) Second sheet substrate
 A 300 μm thick plasticized polyvinyl chloride sheet containing 48 parts by weight of a plasticizer (dioctyl adipate) (a product of Mitsubishi MKV)

With the composition of the photodiffusion agent and the prism apical angle being varied, the following prototype production was performed. Examples 1 to 3 had the following contents:

|  | Ex. 1 | Ex. 2 | Ex. 3 |
|---|---|---|---|
| First sheet substrate | (A) | (A) | (A) |
| Photodiffusion agent composition | (B) | (B) + calcite powder | (B) + phthalocyanine blue |
| Amount of photodiffusion agent coated | 9 g/m² | 18 g/m² | 9 g/m² |
| Prism forming material | (C) | (C) | (C) |
| Prism apical angle | 96° | 96° | 96° |
| Prism pitch | 0.05 mm | 0.05 mm | 0.05 mm |
| Second sheet substrate | (D) | (D) | (D) |
| Second sheet reflectivity | 5.3% | 5.3% | 5.3% |

With the prism apical angle and the reflectivity of the second sheet being varied, the following prototype production was performed. Comparative Examples 1 to 3 had the following contents:

|  | Comp. Ex. 1 | Comp. Ex. 2 | Comp. Ex. 3 |
| --- | --- | --- | --- |
| First sheet substrate | (A) | (A) | (A) |
| Photodiffusion agent composition | (B) | (B) | (B) |
| Amount of photodiffusion agent coated | 9 g/m² | 9 g/m² | 9 g/m² |
| Prism forming material | (C) | (C) | (C) |
| Prism apical angle | 102° | 85° | 96° |
| Prism pitch | 0.05 mm | 0.05 mm | 0.05 mm |
| Second sheet substrate | (D) | (D) | (D) |
| Second sheet reflectivity | 5.3% | 5.3% | 12% |

Details of the Examples and the Comparative Examples will be offered.

Example 1

As the substrate (11), the first sheet substrate (A) was used. The photodiffusion agent composition (B) was coated on the substrate, and dried to form the photodiffusion layer 12. Its coating was performed by roll coating, and the amount of the composition coated was 9 g/m² in dry condition. On the surface of the substrate opposite to the surface on which the photodiffusion layer 12 was formed, prisms of an isosceles triangular shape were formed from the prism forming material (C). These prisms of an isosceles triangular shape, as shown in FIG. 1, were in a striped pattern, and had a sectional apical angle α of 96° and a prism-to-prism pitch of 0.05 mm.

In this manner, the first sheet was prepared which had the photodiffusion layer of the photodiffusion ink composition formed on one surface of the substrate and had the isosceles triangular prismatic shape formed on the other surface of the substrate. On the isosceles triangular prismatic shape side of the first sheet, the second sheet substrate (D) was superposed to complete the reflecting screen of FIG. 1. This substrate itself had reflectivity for all rays of 5.3%. The completed reflecting screen had a gain of 4.6 and an angle of field (half-value angle) of 34°. The gain refers to a gain value= {[screen reflection luminance (cd/cm²)]/[screen incidence illuminance (lux)]}×3.14.

Example 2

A reflecting screen of Example 2 was formed under the same conditions as in Example 1, except that the following photodiffusion agent composition was used in order to add a calcite powder to the photodiffusion layer:

| [Photodiffusion agent composition] | |
| --- | --- |
| Binder: Polyester resin ("Vylon 200", TOYOBO CO., LTD.) | 43 parts by weight |
| Photodiffusion agent: Calcite powder (average particle size 5 μm) | 100 parts by weight |
| Diluents: | |
| Methyl ethyl ketone | 60 parts by weight |
| Toluene | 60 parts by weight (solids content 54%) |

Calcite powder was added in light of its optical characteristics, namely, because light incident on its individual particles is minimally attenuated within these particles and is put out at a high ratio, thus imparting a high luminance to the reflecting screen.

The completed reflecting screen had a gain of 2.5 and an angle of field (half-value angle) of 37°.

Example 3

A reflecting screen of Example 3 was formed under the same conditions as in Example 1, except that the following photodiffusion agent composition was used in order to add phthalocyanine blue to the photodiffusion layer for its coloration:

| [Photodiffusion agent composition] | |
| --- | --- |
| Binder: Polyester resin ("Vylon 200", TOYOBO CO., LTD.) | 43 parts by weight |
| Photodiffusion agent: MBX-10 (a product of Sekisui Plastics Co., Ltd.; material: polymethyl methacrylate, average particle size 10 μm) | 100 parts by weight |
| Colorant: Phthalocyanine blue | 30 parts by weight |
| Diluents: | |
| Methyl ethyl ketone | 60 parts by weight |
| Toluene | 60 parts by weight (solids content 54%) |

The completed reflecting screen had a gain of 4.1 and an angle of field (half-value angle) of 34°, and gave a higher contrast than in Example 1.

Comparative Example 1

A reflecting screen of Comparative Example 1 was formed under the same conditions as in Example 1, except that the prism apical angle of the first sheet was set at 102°.

The completed reflecting screen had a gain of 2.2 and an angle of field (half-value angle) of 36°. When the viewing angle was broadened in the horizontal direction, the second sheet became visible along with the projected image, lowering color reproducibility.

Comparative Example 2

A reflecting screen of Comparative Example 2 was formed under the same conditions as in Example 1, except that the prism apical angle of the first sheet was set at 85°.

The completed reflecting screen had again of 12.4 and an angle of field (half-value angle) of 12°, but caused glare of the projected image.

Comparative Example 3

A reflecting screen of Comparative Example 3 was formed under the same conditions as in Example 1, except that the reflectivity of the second sheet was set at 12%.

The completed reflecting screen had a gain of 2.0 and an angle of field (half-value angle) of 34°, but decreased in contrast.

Figure 4:
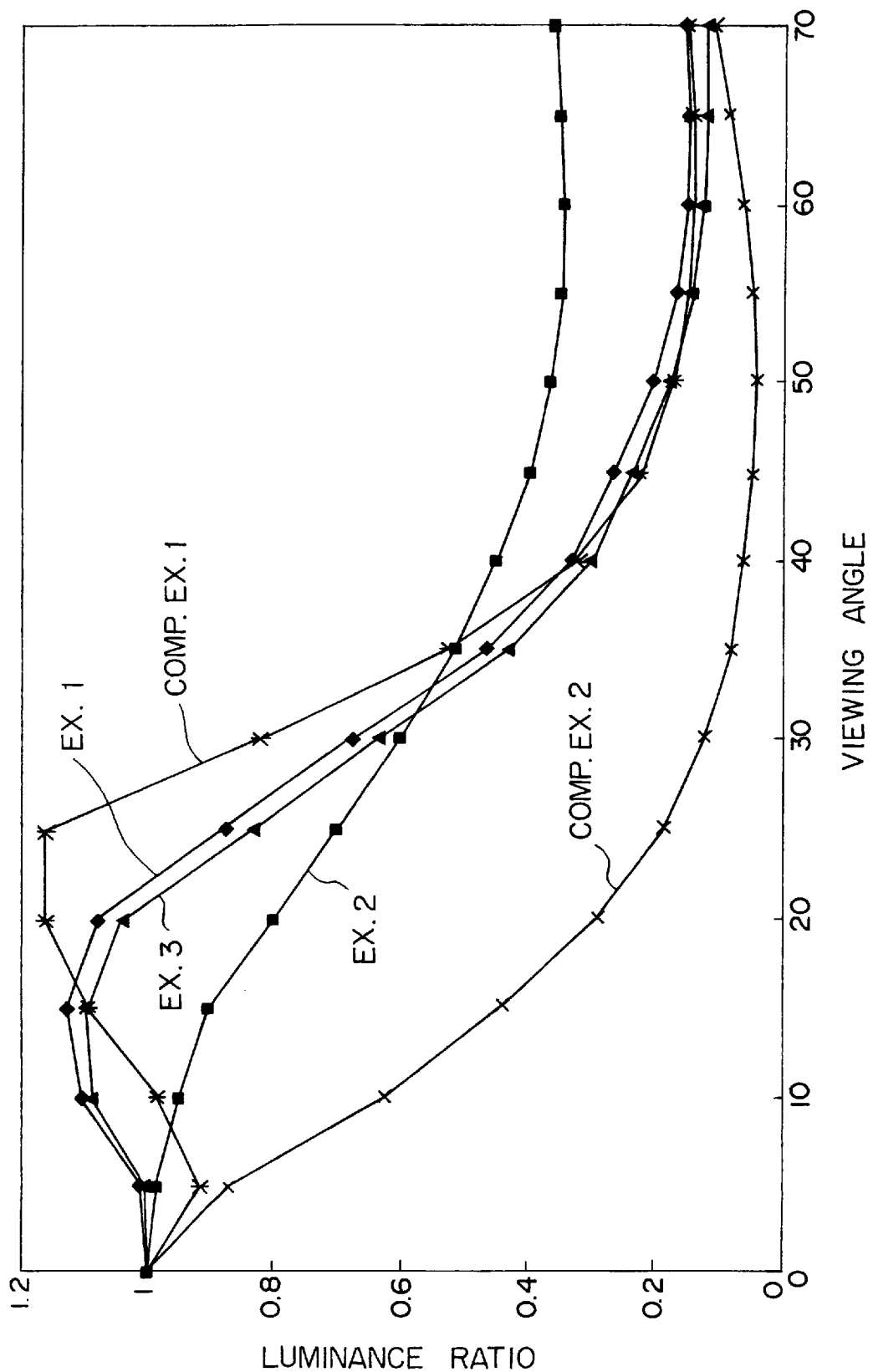
FIG. 4 is a view showing the optical characteristics of reflecting screens obtained in the respective Examples.

FIG. 4 is a view showing the optical characteristics of the reflecting screens obtained in the Examples and Comparative Examples.

As shown in FIG. 4, the reflecting screen of Example 1 had a half-value angle of 34°, the reflecting screen of Example 2 had a half-value angle of 37°, the reflecting screen of Example 3 had a half-value angle of 34°, the reflecting screen of Comparative Example 1 had a half-value angle of 36°, the reflecting screen of Comparative Example 2 had a half-value angle of 12°, and the reflecting screen of Comparative Example 3 had a half-value angle of 34°.

In other words, the reflecting screen with an apical angle α of 96° had a half-value angle of 34° or more, while the reflecting screen with an apical angle α of 85° had a half-value angle of 12°. The reflecting screen with an apical angle α of 102° (Comparative Example 1), on the other hand, had a half-value angle of 36°, but posed the problem that the second sheet was visible. With a reflecting screen of a construction according to the present invention, therefore, it is clear that the apical angle α lies most preferably within the range of from 90° to 100°.

In Example 2 using calcite as a diffusion agent, because of the optical characteristics of calcite, light incident on the individual particles is attenuated minimally within the particles, and put out at a high ratio. Thus, the light may pass through the coating containing calcite powder, and be reflected with high reflectivity, thus imparting high luminance to the reflecting screen.

In FIG. 4, the optical characteristics are revealed in only one direction relative to the horizontal direction (5° above the viewing angle), but appear nearly symmetrically in the reverse direction.

The reflecting screen of Comparative Example 1, as mentioned previously, was wide in the angle of field, but low in gain, and poor in color reproducibility. The reflecting screen of Comparative Example 2 was high in gain, but narrow in the angle of field, and caused glare. Both reflecting screens caused marked scattering of reflected light, and failed to give a high contrast image plane. The reflecting screen of Comparative Example 3 was high in the reflectivity of the second sheet, thus presented with marked reflection of light from an external object other than the projected light, thereby decreasing contrast. Based on these findings, the apical angle of the prisms of the first sheet is desired to be substantially 90° or higher but 100° or lower, and the reflectivity of the second sheet is desired to be 10% or less.

As shown from the foregoing results of the Examples and Comparative Examples, the reflecting screen according to the present invention has the photodiffusion layer on the transparent first sheet, and has behind this sheet substrate the predetermined group of prisms for reflecting projected light, and the second sheet for absorbing scattered light. Thus, this reflecting screen gives a wide angle of field suitable for viewing a reflection image plane, and a high luminance image plane.

We claim:

1. A reflecting screen comprising:

a first sheet having a first surface having a diffusion layer for diffusing a projected image, and a second surface formed on a side opposite to the first surface and having a group of striped prisms of an optically transparent resin arranged so as to extend vertically, said prisms having a section in the shape of an isosceles triangle with a constant apical angle and sides of constant length; and a second sheet opposed to the group of prisms of the second surface of said first sheet, a surface of said second sheet opposed to the group of prisms being of a black color capable of absorbing transmitted light substantially;

said first sheet and said second sheet being disposed parallel to each other.

2. The reflecting screen of claim 1, wherein the apical angle of the isosceles triangular prism is 90° to 100°.

3. The reflecting screen of claim 1, wherein the apical angle of the isosceles triangular prism is substantially 96°.

4. The reflecting screen of claim 1, wherein the first sheet substantially comprises three layers, comprising a layer constituting the group of prisms, a base film layer, and the diffusion layer.

5. The reflecting screen of claim 1, wherein the diffusion layer of the first surface of the first sheet is colored so as to give an absorption peak for a wavelength ranging from 530 nm to 570 nm.

6. The reflecting screen of claim 1, wherein the group of prisms of the second surface of the first sheet is colored so as to give an absorption peak for a wavelength ranging from 530 nm to 570 nm.

7. The reflecting screen of claim 1, wherein the black surface of the second sheet has reflectivity for all rays of 10% or less.

* * * * *